United States Patent [19]

Hebert

[11] 4,403,644
[45] Sep. 13, 1983

[54] METHOD AND APPARATUS FOR ROOM TEMPERATURE STABILIZATION

[76] Inventor: Raymond T. Hebert, P.O. Box 134, Saratoga, Calif. 95071

[21] Appl. No.: 419,728

[22] Filed: Sep. 20, 1982

[51] Int. Cl.$^3$ ............................................. F28D 21/00
[52] U.S. Cl. ..................................... 165/1; 62/238.6; 62/238.7; 62/324.1; 62/430; 165/104.11; 165/10; 237/2 B
[58] Field of Search ........................ 165/104.11, 1, 10; 62/430, 93, 324.1, 238.6, 238.7; 237/2 B

[56] References Cited

U.S. PATENT DOCUMENTS

| | | | |
|---|---|---|---|
| 2,682,758 | 7/1954 | Harris | 62/93 X |
| 3,744,272 | 7/1973 | Oldberg | 165/104.11 X |
| 4,037,650 | 7/1977 | Randall | 165/18 X |
| 4,062,347 | 12/1977 | Jensen | 165/104.11 X |
| 4,100,092 | 7/1978 | Spauschus et al. | 165/104.11 |
| 4,326,344 | 4/1982 | Smith | 165/47 X |

FOREIGN PATENT DOCUMENTS 54-112548 9/1979 Japan ...................... 62/93

*Primary Examiner*—Albert W. Davis, Jr.
*Attorney, Agent, or Firm*—Robert B. Block

[57] ABSTRACT

A compact heat storage system for over heated rooms in which a high value thermal mass is mounted in a forced air flow path formed within a refrigeration heat exchanger loop including a condenser at the inlet and an evaporator at the outlet interconnected with a compressor and an expansion control. The thermal mass is preferably PCM or the equivalent. In the heat storage mode, with the compressor in operation, the air flow is heated at the condenser so that the heated incoming air passes through the thermal mass with high thermal difference resulting in better thermal transfer efficiency. After passage, the air has been cooled by thermal transfer with the thermal mass and is further cooled by the evaporator and then passed back into the room significantly cooler than when entered.

When the room space needs heat from the system, the fan is operated without the compressor to pull the cool air from the room through the thermal mass to heat the same. The limits of capability are essentially those of the thermal mass and are adequate for significant room spaces.

8 Claims, 6 Drawing Figures

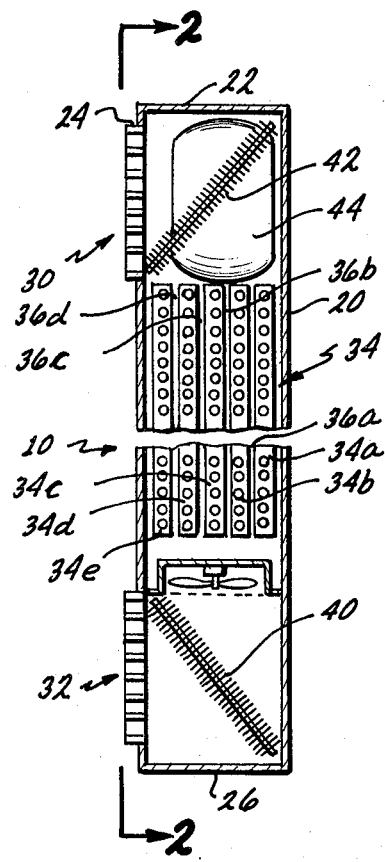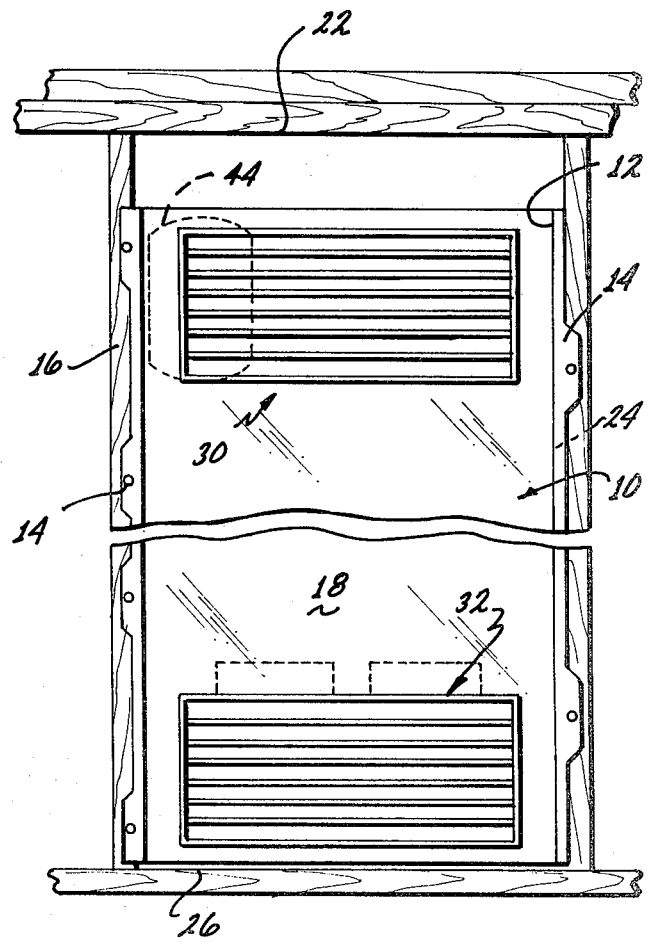
Fig. 1
Fig. 2

METHOD AND APPARATUS FOR ROOM TEMPERATURE STABILIZATION

BACKGROUND OF THE INVENTION

This invention relates to the heating and cooling of room air spaces by thermal exchange with a heat store, and, more particularly, to such heating and cooling using a heat store emphasizing a high thermal mass of PCM material.

As used herein, the expression PCM is an abbreviation for phase change materials and is intended to denote a broad class of hydrated salts which undergo a fusion and crystalization phase transition at above comfortable room temperature, at about 80–90 degrees Fahrenheit. In the present application, PCM includes not only these salts but other materials which are useful for storing thermal energy. It is however more economical and more space conserving to utilize phase change materials than to use other thermal storage means. Preferred phase change materials include the known compounds as sodium sulfate decahydrate, which melts at 90° F. and calcium chloride hexahydrate which melts at 80° F. A heat store is a mass of PCM material supported and arranged in a convenient array for passing a heat exchange fluid therethrough.

The phenomena of overheating of buildings of relatively light mass by solar exposure or intermittent energy consuming processes carried out in such buildings is recognized and well documented. The solution of adding thermal mass to average out thermal excursions and to stabilize the temperature of such buildings is also known. The present invention is directed to incorporating a phase change material (PCM) as the thermal mass for this purpose in such a way as to render the PCM as highly effective and capable of both giving heat to building spaces within the building and of taking out heat from the room space.

Overheating of buildings is generally controlled by suitable ventilation, insulation, air conditioning and by proper placement, size, and shading of the glazing. Overheating can be caused by solar heat absorption in residential or office structures, and by lighting, occupancy, and process control in commercial manufacturing structures. However, during the heating season, excessive thermal energy gain can be advantageous if this energy is preserved for periods over which there is a heating demand. It is known that the addition of thermal mass to a structure can absorb and retain excess energy thereby stabilizing the temperature at a comfortable level. Various proposals for temporary storage of energy have been made. Reference is made to U.S. Pat. No. 4,037,650 wherein a thermal exchange between two thermal stores is achieved with a refrigeration heat transfer system room air is used in the heat exchange media in the external circuit. Heat is transferred between the stores in oen cycle of operation and is transferred to or from the room by operation of either selected one of the stores. This system is unduly complex, requiring separated stores of PCM, separate fans, and separate control circuits for heating and cooling. In its heat transfer cycle no set heating or cooling of room air takes place, while on entry heating and cooling only one-half of the thermal storage capacity is in use.

While it is also known to provide excess solar gain through southerly glazing, even in retrofit situations it is generally more complex and expensive to add a thermal mass, especially in the such retrofit situation. Consequently, overheating occurs in many structures. Or, if desired, it can be made to occur even in winter on cold sunny days. In general the overheated air in the building is circulated over the surface area of containers of stored thermal mass containing, for example, phase change materials (PCM) to absorb the excess energy for later use. Phase change materials are particularly suitable for this purpose; they have the ability to store very large amounts of energy at a given melting temperature by virtue of their high latent heat of fusion. However, such thermal mass cannot be effectively utilized with the generally small temperature differentials, less than about 20 degrees, which are usually to be encountered. In any event, the temperature variations which are sufficient to cause discomfort to persons are usually insufficient for the purpose of creating an adequate differential temperature for efficient heat transfer in systems. Thus, while a thermal storage unit for use in structures where overheating naturally occurs would be desirable, it is generally unavailable in any effective way. There is therefore a need for a new improved thermal storage system.

SUMMARY OF THE INVENTION AND OBJECTS

In general, it is an object of the present invention to provide a thermal storage and stabilization system which will overcome the above limitations and disadvantages.

A further object of the invention is to provide a thermal storage and stabilzation system of the above character which is compact and relatively inexpensive and serves to stabilize interior building room temperatures at a comfortable level without the necessity of employing massive or solar exposed building materials.

A further object of the invention is to provide a new thermal storage system in broad concept which employs a combination of a refrigeration heat exchange system with a high density PCM thermal storage array in such a way as to utilize the usual discomforting thermal differences normally found in building spaces and rooms and to enhance such differences to the point where effective thermal exchange and storage with simultaneous cooling can be accomplished in one cycle of operation; and in which the stored heat can be recovered easily at a later time.

A further object of the invention is to provide a thermal storage and stabilization system of the above character which is capable of absorbing excess heat from building air spaces and rooms during the day and which can return this excess heat to the room during nightime hours.

A further object of the invention is to provide a thermal storage and stabilization system of the above character which is simple in construction, which utilizes a well-established refrigeration technology capable of virtually indefinite operation without maintenance or recharge.

A further object of the invention is to provide a thermal storage and stabilization system of the above character which serves the function of considerable addition of thermal mass in solar home design, which absorbs excess solar energy when available and is capable of releasing it to satisfy heating requirements. But, unlike passive mass alone, the invention requires a small amount of electrical energy to power the associated refrigeration cycle compressor while gaining the considerable advantage of not needing direct solar exposure.

A further object of the invention is to provide a thermal storage and stabilization system of the above character which does not require the same to be incorporated into a building structure in order to function most effectively, rather may be a free-standing unit incorporated as it were in existing furnishings, such as in the base of a coffee table and which operates on resident thermal energy such as that supplied by usual building windows, walls, and occupancy.

In general, the objects of the present invention are achieved utilizing a high efficiency thermal storage block preferably made of PCM material, of known type in a configuration in which the heat storage capacity per unit volume is very high. However, thermal energy cannot be efficiently transferred from room air through to the phase change material unless a temperature differential between them is created which is appropriately large. For it is known that the efficiency of transfer between the media is proportional to the magnitude of the temperature differential. For example the phase change material has a fusion (melting) temperature of 80° F. An air temperature significantly in excess of 80° would be required to effectively transfer energy to the material and an air temperature significantly below 80° would be required to withdraw energy from it. If excessive material and unduly high heat exchanging surface areas are to be avoided in the design the result becomes an unnecessarily and uncomfortably high temperature fluctuation. The present invention avoids this result. The invention operates by selecting a high heat exchange temperature for transferring heat from the room to PCM and achieves this temperature by incorporating the PCM in a forced air flow path having an inlet and an outlet the inlet and outlet being part of a refrigeration heat exchanger having a condensor at the inlet end and an evaporator at the outlet end. The refrigeration system is operated by the usual compressor and expansion circuit valves so that the condenser at the inlet end becomes heated during operation to raise warm room air to a hot temperature before passing through the thermal storage material. After passage through the material the cooled air is further cooled by the evaporator on the air exhaust side. It is found that even with the nominal operating air temperature of 72° F. incoming air to the thermal storage block is raised by approximately 25° and exhausted air is cooled to about 65°. The storage of heat can continue under thermostatic control until the heat sources have been depleted or the phase change material has been fully transitioned across the fusion temperature into a liquid state at which point a sensor can note significant temperature rise in the material can be used to shut the system off.

Later, during periods when supplementary heat is required to maintain comfortable air temperatures, the fan alone is operated to circulate air through the PCM without the refrigeration cycle and to withdraw energy from the phase change material. This can continue under thermostatic contol until the desired degree of heated comfort is achieved or until the material completely solidifies.

In these ways the system of the present invention functions in the manner of a large mass in a passive solar home to absorb excess thermal energy when it is available and to release the energy to satisfy heating requirements. Unlike passive mass, the invention requires a small amount of electrical energy to power the refrigeration cycle compressor but does not require direct solar exposure and related building structural components in order to function most effectively.

The invention can be packaged in a number of forms. For example it can be modularized for interstud mounting in interior walls or it can be arranged as a part of a movable furnishing such as a cocktail table. A portable unit is especially attractive in that energy can be withdrawn from it at the immediate point of need, as, for example, in a specific room, while allowing the remainder of a building to cool down to a more economical temperature.

These and other objects and features of the invention will become apparent from the following description and claims when taken in conjunction with the accompanying drawings of which:

BRIEF DESCRIPTION OF THE DRAWINGS

FIG. 1 is a side elevational view in schematic form of a modular form of the thermal storage and stabilization system of the present invention adapted for interstud mounting in an interior building wall.

FIG. 2 is an elevational front view of the system of FIG. 1 taken along the lines 2—2 thereof.

DETAILED DESCRIPTION OF THE PREFERRED EMBODIMENTS

Figure 3:
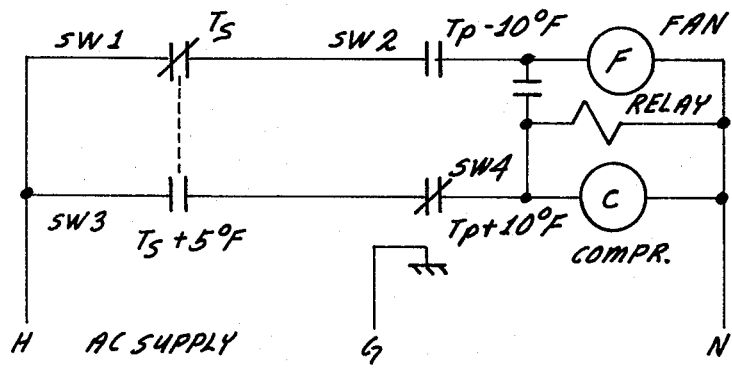
FIG. 3 is an schematic electrical diagram of the control circuits of the invention of FIG. 1.

Referring to FIGS. 1 and 2 there is shown a modular construction of thermal stabilization unit 10 adapted for use as a builtin wall unit adapted to be mounted between wall studs in a conventional room wall so that the unit is completely operative and accessible through the room side of the wall. The unit includes an outer frame 12 including tabs 14 for extending over the studs 16 to which the frame is secured, as by nailing. The frame includes front mounting panel 18, a rear panel 20 as well as top, bottom and side panels 22, 24, 26 for enclosing the same. An air intake vent 30 is provided across the upper front panel and an air exhaust vent 32 is provided across the bottom of the front panel.

The central region of the unit between the air intake vent and the air exhaust vent houses a thermal storage section 34 preferably made of a phase change material (PCM). The PCM material itself can be selected from any of the various known materials as previously set forth and include sodium sulfate decahydrate ($Na_2SO_4.10H_2O$, melts at 90° F.) and calcium chloride hexahydrate ($CaCl_2.6H_2O$, melts at 80° F.).

The PCM material is encapsulated in panels 34a–e which are made of plastic and which organize the PCM into a plurality of horizontally arranged channels which prevents separation of the PCM material components during repeated cycling through the fusion temperature. These panels also organize the material into vertically arranged parallel planes which are spaced from each other and provide a plurality of vertical flow channels 36a-d extending from the air intake to the air exhaust side of the unit. This provides for a large surface area for thermal exchange between the circulating air and the PCM panels. Reference is made to my U.S. Pat. No. 4,213,488 issued July 22, 1980 for a discussion of the construction and use of panels of phase change material.

Means are provided for forming a driven air flow stream through the PCM panels and consists of one or more fans 38 mounted preferably on the exhaust side of the panels for pulling air therethrough.

Means is provided for transfering heat from the air stream at the outlet and further means is provided for receiving removed heat and for adding the same to the air stream at the inlet. Preferably such means takes the form of a simple refrigeration cycle evaporator and condenser circuit consisting of a evaporator 40 mounted across the air exhaust side of the unit and a condenser 42 mounted across the air intake vent of the unit. A suitable compressor 44 and expansion valve (not shown) is employed together with a fluid circuit including a working fluid for interconnecting the foregoing components into a working refrigeration system in which heat is transferred from the evaporator to the condenser by the working fluid. The evaporator and compressor can be of typical construction such as are used in air conditioners and refrigerators in which a tubular coil passes back and forth in a generally planar array and is provided with fins to enhance thermal exchange with the air stream which passes through it. The refrigeration cycle working fluid can be of any suitable type as are used in air conditioners.

FIG. 3 shows a circuit diagram of the switching circuits for controlling the operation of the fan and the compressor. All switches are shown in their below temperature contact position and are designed to have a minimum of 2° F. hysteresis. Thus the fan and compressor are designed to be operated from a typical AC supply line having a hot line, a neutral line and a ground line. Switches SW1 and SW2 are connected in series to the fan while switches SW3 and SW4 are connected in series to the compressor. Switch SW1 thermostatically turns on the fan for heating when the room temperature is below preset thermostat temperature. This is an owner controlled variable thermostatic switch mounted external to the unit usually on the wall of the room.

Switch SW2 shuts off the fan when the phase change panels fall below the phase change temperature ($T_p - 10°$ F.), which occurs when the phase change materials have been completely discharged and no further heat can be extracted from the unit. Switch SW2 is a fixed temperature snap action switch placed in direct contact with the phase change material in a location likely to be last discharged (see FIGS. 1 and 2 for switch placement). A refrigeration cycle system and control circuit is installed as in the embodiment of FIGS. 1–2, and include evaporator 40, condenser 42, compressor 44 and expansion valve (not shown) together with a fluid circuit for interconnecting the same.

Switch SW3 which is usually made a part of the overall unit and incorporated with switch SW1. SW3 thermostatically turns on the compressor in the storage mode when the room temperature is more than 5° F. in excess of a preset thermostat temperature. Switch SW4 shuts off the compressor when the phase change panels are completely charged, i.e., when the temperature of the panels rises above the phase change temperature plus approximately 10° F. This is a fixed temperature snap action switch which may be placed in direct contact with the phase change panel array in a location likely to be last charged. A solenoid operated relay switch is connected across the compressor and the fan so as to turn the fan or whenever the compressor is powered. The following chart summarizes the above conditions.

Specific constructional details necessary to construct the apparatus of the present invention may be varied over a wide range. Some account will have to be made to match the compressor capacity with the amount of phase change material and the fan operating capacities. Typically the compressor and fan sizing are only dependent on the design delivery capacity of the unit. A typical unit using a compressor of about 200 to 500 watts driving a common refrigerant working fluid such as R12 would require a comparable fan size of about 100 to 300 cfm.

In operation, the system of the present invention is effective in being able to create a temperature differential between the phase change material and the warm room air which is sufficient to raise the efficiency of transfer of heat which is proportional to the magnitude of the temperature difference. For example, phase change material having a melting temperature of 80° F. would require an air temperature significantly in excess of 80° in order to effectively transfer energy through the material. And, likewise, an air temperature significantly below 80° would be required to withdraw energy from it. Excessively severe materials requirements would be required as well as considerable discomfort were room temperature variations used which are adequate to efficiently use the material without the refrigeration cycle combination disclosed. Thus, the present invention solves an important problem in achieving a high thermal transfer efficiency and capability in materials of general availability and allows a very satisfactory thermal unit to be employed within a reasonable and comfortable range.

Figures 4A, 4B:
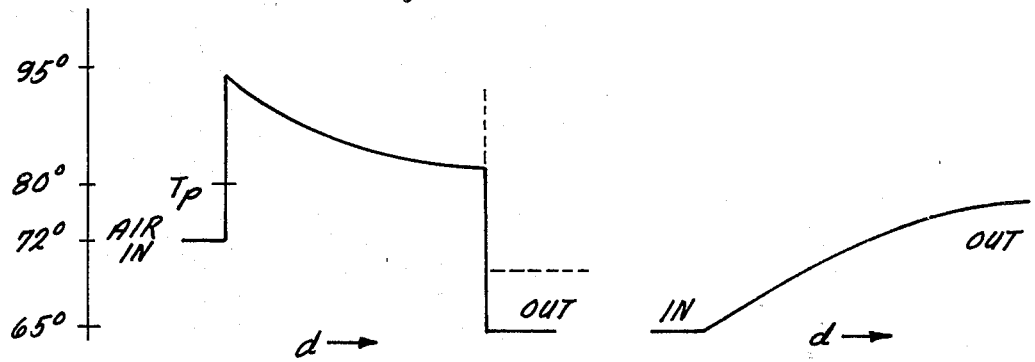
FIG. 4a is a graph of temperature from inlet to outlet of the apparatus of FIGS. 1-3 taken during the cooling cycle.
FIG. 4b is a graph of temperature from inlet to outlet of the apparatus of FIGS. 1-3 taken during the heating cycle.

FIG. 4 is a series of graphs which depict the operation of the device and illustrate the temperature ranges through both a heating cycle and a cooling cycle. Thus FIG. 4a shows that incoming air is heated by the condensor to well above the fusion temperature of the material which is assumed, for illustration purposes, to be 80° F. As such, high thermal transfer can occur with the phase change material and during such transfer the material will cool the incoming air stream down to about 85° after which the air stream passes through the evaporator and is cooled by an amount approximating that was previously heated and is discharged from the unit at about 65°, a pleasantly cool temperature. As the entire body of phase change material becomes charged it no longer is able to internally cool the heated incoming air and eventually rises above a critical temperature which may be set in accordance within wide variations, as, for example, 5° F. to 10° F. higher than the phase change material transition temperature. At this point the incoming air and exiting air temperature will approximate each other, as shown in the dotted lines, and the unit is set to turn off for want of capacity. These conditions are shown in dashed lines. During the heating cycle the situation is somewhat simplier since the fan alone is in operation and incoming cool air is heated by thermal exchange in passing through the device. This is summarized in FIG. 4b.

Figure 5:
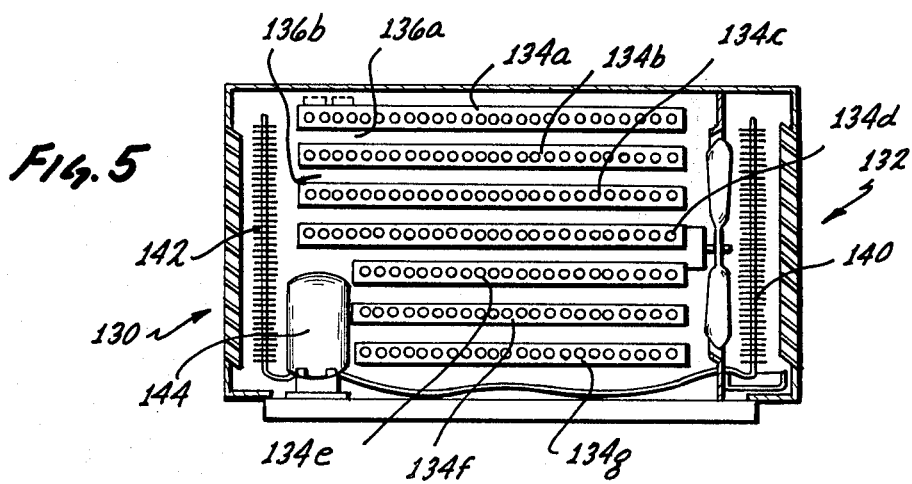
FIG. 5 is a side elevational view and cross-section of a configuration of the thermal storage and stabilization unit of the present invention in a portable piece of furniture.

FIG. 5 illustrates a form of construction of the invention designed to be moveable and located as a free standing unit within a room. Such a portable furnishing may for example be constructed into and form the the base of a coffee table. The elements are the same as previously set forth and like parts have been given like numbers raised by 100. Thus a framework 112 is provided for supporting the various components including an array 134 of PCM panels 134a–g which are arranged horizontally to define a plurality of channels 136a–e for passage of air therethrough. The framework includes an air intake vent 130 opening at one side and an air discharge or exhaust 132 opening at the other side. A fan 138 is provided for moving through the unit and the condensor and evaporated are located at the inlet vent and oulet vent respectively. Room air temperature thermostats may be located on the outside surface and thermally insulated from the inside in order to appropriately sense the room temperature and to provide easy access for the owner.

The portable unit is especially attractive in that energy can be withdrawn from it at a point of need without the cost of air conditioning or heating the entire building and, there is no installation cost. Thus during periods when supplementary heating is required to maintain a comfortable air temperature the unit's fan circulates air throught the storage unit, without refrigeration cycle, and withdraws energy from the phase change material. This process can continue under thermostatic control until comfort is achieved or until the material completely solidifies.

In these ways the invention functions like the mass in a passive solar home to absorb excess thermal energy when it is available and to release the energy to satisfy heating requirements when needed. Unlike passive mass, the invention requires that a small amount of electrical energy be used to power the refrigeration cycle compressor. As is known, these requirements are quite modest indeed and may be readily supplied at low cost. Also there is no need to provide direct solar exposure in order for effective functioning as was a design feature of previous wall mounted uses of PCM material.

Table I summarizes the state of the switching circuits in response to various possible conditions.

If $T_R$ is room temperature and $T_S$ is thermostat setting, then:

TABLE I

| | | | | | |
|---|---|---|---|---|---|
| (A) $T_R < T_S$ (PCM charged) | SW 1 ON | SW 2 ON | FAN | ON | HEAT |
| (B) [But if PCM discharged | SW 1 ON | SW 2 OFF | FAN | OFF | —] |
| (C) $T_R < T_S + 5° F.$ | SW 3 OFF | SW 4 OFF/ON | FAN/COMP | OFF | — |
| (D) $T_R > T_S + 5° F.$ | SW 3 ON | SW 4 ON | FAN/COMP | STORE-COOL | |
| | Automatically turns fan on via relay SW 5 | | | | |
| (E) [But if storage > 10° F. + $T_P$ | | SW 4 OFF | FAN/COMP | OFF | —] |

What is claimed is:

1. Method for the efficient storage of heat from a fluid body comprising the steps of selecting a PCM body with a fusion transition of a predetermined temperature relative to temperature of said fluid body, moving the fluid stream through the PCM body in thermal exchange relation therewith to establish a fluid stream inlet and outlet with said body, removing heat from the outlet fluid stream and adding the removed heat to the inlet fluid stream at a higher temperature so as to utilize a higher thermal transfer efficiency from the fluid stream to the PCM material as the same passes therethrough whereby heat is efficiently withdrawn from the fluid stream and stored in the PCM body as it passes therethrough and exits therefrom substantially cooler.

2. A thermal storage apparatus comprising a PCM body, fluid circulation means for passing a fluid through said PCM body, and means forming a compression refrigeration cycle having a condenser in series with the intake thereto and a evaporator in series with the exhaust therefrom, and pump means for driving the fluid through the system.

3. A thermal storage apparatus comprising a PCM body for storing heat, means for supporting the body in sub-divided form for being in heat exchange relation with a body of air and including means defining an air intake, means defining an air exhaust, means forming a fan for moving air from said intake through the PCM sub-divided body to said exhaust, means forming a regrigerant compression system in cooperation with said intake and exhaust including a evaporator mounted in said exhaust airflow path, a condenser mounted in said intake flow path, a compressor connected to condense and evaporate a refrigerant under pressure and to cause the same to be operatively connected from said condenser to said evaporator, means for electrically operating the compressor and fan in a charging mode to bring in heated air and to exhaust cool air, and means for alternatively electrically operating the fan only in a heating mode to exhaust heated air after passing through said heat charged PCM body.

4. A heat storage device for removing or adding heat from a fluid, a quantity of PCM, means for supporting said quantity in an array adapted for heat exchange relationship with said fluid and subdivided into channels to discourage stratification as the same is cycled through the fusion temperature, means forming an inlet and means forming an outlet for said fluid to be passed through said body and heat transfer contact therethrough, means for removing heat from the fluid at the outlet end, and means for receiving said heat from said last named means and for adding the same at a higher temperature to the fluid at the inlet end.

5. The heat storage device as in claim 4 in which said means for removing heat comprises and said means for adding heat comprises an evaporator disposed across the fluid outlet and a condensor disposed across the fluid inlet, and a compressor, and expansion valve, and fluid circulating means including a working fluid for interconnecting said evaporator, condensor, compressor and expansion valve into a refrigeration cycle heat transfer combination.

6. A heat storage and dispensing device as in claim 5 further including means for electrically operating the compressor and fan in a PCM charging mode when heat is desired to be removed from the fluid, and further including means for electrically operating the fan only, in a heat dispensing mode, for recovering heat stored in said PCM material.

7. The heat storage apparatus as in claim 6 further including means responsive to manual control for adjusting the operating point of said device.

8. A temperature control and stabilizing system for rooms comprising PCM means for storing heat and having a high heat capacity at a predetermined temperature, means for arranging a supporting said PCM means for passing of room air therethrough in thermal contact throughout, a room inlet and a room outlet located at opposite ends of the air flow stream through said material, a refrigeration cycle heat exchanger comprising a compressor, a condenser coil mounted across said inlet, an expansion circuit and an evaporator coil mounted across said outlet, a working fluid incorporated in said heat exchanger, fan means for moving air through said system from the room inlet to the room outlet, switching means for operating said fan means and said compressor simultaneously when room temperature exceeds a predetermined level, and switch means for turning on said fan means alone when the room temperature is below a second predetermined level.

* * * * *